No. 741,585. Patented October 13, 1903.

UNITED STATES PATENT OFFICE.

OSCAR LIEBREICH, OF BERLIN, GERMANY.

PROCESS OF PRODUCING GLYCERIN AND ACIDYLATED DERIVATIVES OF AROMATIC BASES AND THE PRODUCT THEREOF.

SPECIFICATION forming part of Letters Patent No. 741,585, dated October 13, 1903.

Original application filed June 7, 1901, Serial No. 63,637. Divided and this application filed April 28, 1903. Serial No. 154,702. (Specimens.)

*To all whom it may concern:*

Be it known that I, OSCAR LIEBREICH, a subject of the Emperor of Germany, residing at Berlin, Germany, have invented a new and useful Process of Producing Glycerin and Acidylated Derivatives of Aromatic Bases and the Product Thereof, of which the following is a specification.

This application is a division of my application filed June 7, 1901, Serial No. 63,637.

This invention relates to a process of manufacturing acidylated derivatives of aromatic bases and anhydrous glycerin in one single operation; and it consists in heating glycerids of fatty acids—the so-called "fats" or "oils"—with aromatic bases. The aromatic bases for the said purpose are: 1, anilin; 2, bases of the naphthalin series; 3, aromatic diamins; 4, monoalkoyl derivates of the bases named in Nos. 1 to 3; 5, homologues of the bases named in Nos. 1 to 3 and of the monoalkoyl derivates of same.

In the performance of the invention I may operate as follows: I heat the fats—for instance, ox-tallow—with an equivalent weight or, better, with an excess of the aromatic base—for example, anilin—to 200° centigrade for twelve to twenty hours; but the conditions may be varied. However, it is to be observed that at a lower temperature the reaction generally requires more time. The heating may be effected in an open or in a closed vessel. When doing so, the acid radicals of the fat leave the molecule of the fat and go to the anilin, while glycerin is produced in anhydrous form, because in this kind of saponification no water is present. The chemical reactions in this process are to be seen from the following formula:

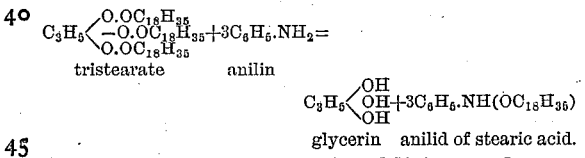

tristearate  anilin glycerin  anilid of stearic acid.

The formula shows that in addition to the anhydrous glycerin there is formed an anilid or aromatic amid of fatty acid. The products produced by this process may be separated from each other by crystallization or by fractional distillation at low pressure. If it is desired to separate the constituents of the resulting compound by fractional distillation at low pressure, at first the anilin in excess will be distilled at 60° to 65° centigrade. When the compound is further heated, the anhydrous glycerin will be distilled, its boiling-point being at about 170° centigrade, whereas the boiling-point of the anilids is between 300° and 360° centigrade. When separated, the anilid of stearic acid is a solid substance which melts at about 82° centigrade. The said reaction of the fats on the aromatic bases may be performed, if desired, in such a manner that instead of the aromatic bases themselves substances are combined with the fats and fatty acids which are adapted to form aromatic bases by reacting on each other. In this way I may use instead of aromatic bases themselves mixtures of salts of the said bases and of alkali, (not in excess,) for instance. I may use instead of anilin a mixture of equivalent portions of hydrochloric anilin and of quicklime.

The acidylated derivatives of aromatic bases produced in the above-described manner may be used alone or preferably in mixture with fatty acids, fats, or fat-like substances of any origin as a raw material for the manufacture of candles, wax colors, unguents, hydrophile salves, &c., because such bodies generally have higher melting-points and are more capable of absorbing water than the said fatty acids, fats, and fat-like substances themselves.

Having fully described my invention, what I claim is—

1. The process of simultaneously producing glycerin and acidylated derivatives of aromatic bases, consisting in heating glycerids of fatty acids, the so-called fats or oils, with aromatic bases, and separating the products produced thereby, for substantially the purposes set forth.

2. The process of producing a raw material for candles, wax colors, salves, unguents, which consists in heating a glycerid of a fatty acid with an aromatic base.

3. The process of simultaneously producing glycerin and a raw material for candles, wax colors, salves, unguents, &c., which consists in heating fats with aromatic bases, and separating the products produced thereby.

In testimony whereof I have signed this specification in the presence of two subscribing witnesses.

OSCAR LIEBREICH.

Witnesses:
 HENRY HASPER,
 WILLIAM MAYNER.